United States Patent
Tadros

(10) Patent No.: US 6,699,416 B2
(45) Date of Patent: Mar. 2, 2004

(54) IMPACT MODIFIER MATERIAL AND METHOD AND APPARATUS FOR THE PRODUCTION THEREOF

(75) Inventor: Safwat E. Tadros, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 412 days.

(21) Appl. No.: 09/813,638

(22) Filed: Mar. 21, 2001

(65) Prior Publication Data

US 2003/0102588 A1 Jun. 5, 2003

(51) Int. Cl.[7] .............................................. B29C 47/60
(52) U.S. Cl. .............. 264/142; 264/211.21; 264/211.23
(58) Field of Search ................... 264/68, 141, 142, 264/143, 211.21, 211.23; 425/204, 208; 366/85, 88

(56) References Cited

U.S. PATENT DOCUMENTS

| | | | | |
|---|---|---|---|---|
| 4,112,039 A | * | 9/1978 | Cuff | 264/142 |
| 4,264,553 A | * | 4/1981 | Loo | 264/142 |
| 5,521,252 A | * | 5/1996 | Matsuda et al. | 525/255 |
| 5,589,531 A | * | 12/1996 | Menashi et al. | 524/409 |
| 5,611,983 A | | 3/1997 | Ma et al. | |
| 5,738,941 A | | 4/1998 | Pero et al. | |
| 5,783,066 A | | 7/1998 | Aylmore | |
| 6,361,724 B1 | * | 3/2002 | Maeda et al. | 264/85 |

OTHER PUBLICATIONS

Plastics Engineering Handbook, 4th Edition, Frados, Joel, Ed., pp. 156–168 and 201–203, 1987.*

* cited by examiner

Primary Examiner—Mark Eashoo

(57) ABSTRACT

A method for processing an impact modifier material having a core and shell molecular structure comprises working the impact modifier material in a mild extruder to a state such that at least a portion of the shells of the impact modifier material fuse together to form an impact modifier material output, and pelletizing the impact modifier output. The output is preferably pelletized, and produces pellets having a narrow size distribution.

14 Claims, 3 Drawing Sheets

IMPACT MODIFIER MATERIAL AND METHOD AND APPARATUS FOR THE PRODUCTION THEREOF

BACKGROUND OF THE INVENTION

The present invention relates to impact modifier materials and methods and apparatus for the production thereof.

Impact modifiers and other additives are commonly introduced into plastics to attain desired properties such as impact strength. Typically, these impact modifiers are core and shell polymers such as methacrylate butadiene styrene (MBS), acrylonitrile butadiene styrene (ABS) or acrylonitrile styrene acrylic (ASA).

Conventionally, these impact modifiers are introduced into the plastics as powder. However, power handling may pose a safety hazard even with the use of special handling equipment to eliminate dust clouds. Fines and longs, which are generally particulates that are prone to become airborne, generally are separated in a cyclone or within a bag filter apparatus. Therefore, attempts have been made to provide impact modifiers in a suitable form for subsequent processing, for example, as pellets.

Impact modifiers have been formed into pellets to facilitate handling. However, commercially available pellets of impact modifiers are expensive, and are deficient in that they have a very wide size distribution range, including fines and longs. For many plastic processing techniques, such airborne prone particulates are unacceptable. Further, fines may bridge and therefore hinder feed when introduced in plastic processing techniques. Additionally, the varying size distributions may segregate, resulting in variations in the plastic composition.

Generally, pellet formation of any material involves extrusion followed by pelletization. During extrusion, the powder is subjected to very high temperatures and pressures. However, formation of impact modifier pellets while retaining the core and shell structure is difficult due to degradation (e.g., scorching) when the material is subjected to the high pressures and temperatures. Impact modifiers having a high rubber cross link density are especially difficult to extrude and subsequently pelletize.

Therefore, it is desirable to provide a form of impact modifiers (i.e., pellets or continuous strands) that retains the core and shell structure during processing. Further, it is desirable to provide forms of impact modifiers that are free-flowing and have narrow size distribution, which generally enhances feeding and compounding of the pellets.

BRIEF SUMMARY OF THE INVENTION

A method for processing an impact modifier material having a core and shell molecular structure, comprises working the impact modifier material in a mild extruder to a state such that at least a portion of the shells of the impact modifier material fuse together to form an impact modifier material output, and pelletizing the impact modifier output.

In another embodiment, a method of pelletizing impact modifier material comprises consolidating the impact modifier material in an extruder; heating the impact modifier material while in the extruder; plasticizing the impact modifier material, wherein the impact modifier material comprises a core and shell structure and wherein the impact modifier material is heated to a temperature less than the melting temperature of the shell of the impact modifier material; and pelletizing the plasticized impact modifier material.

BRIEF DESCRIPTION OF THE DRAWINGS

A better understanding of the features and advantages will be obtained by reference to the following detailed description of the invention and accompanying drawings which set forth illustrative embodiments, wherein.

DETAILED DESCRIPTION OF THE PREFERRED EMBODIMENTS

Figure 1:
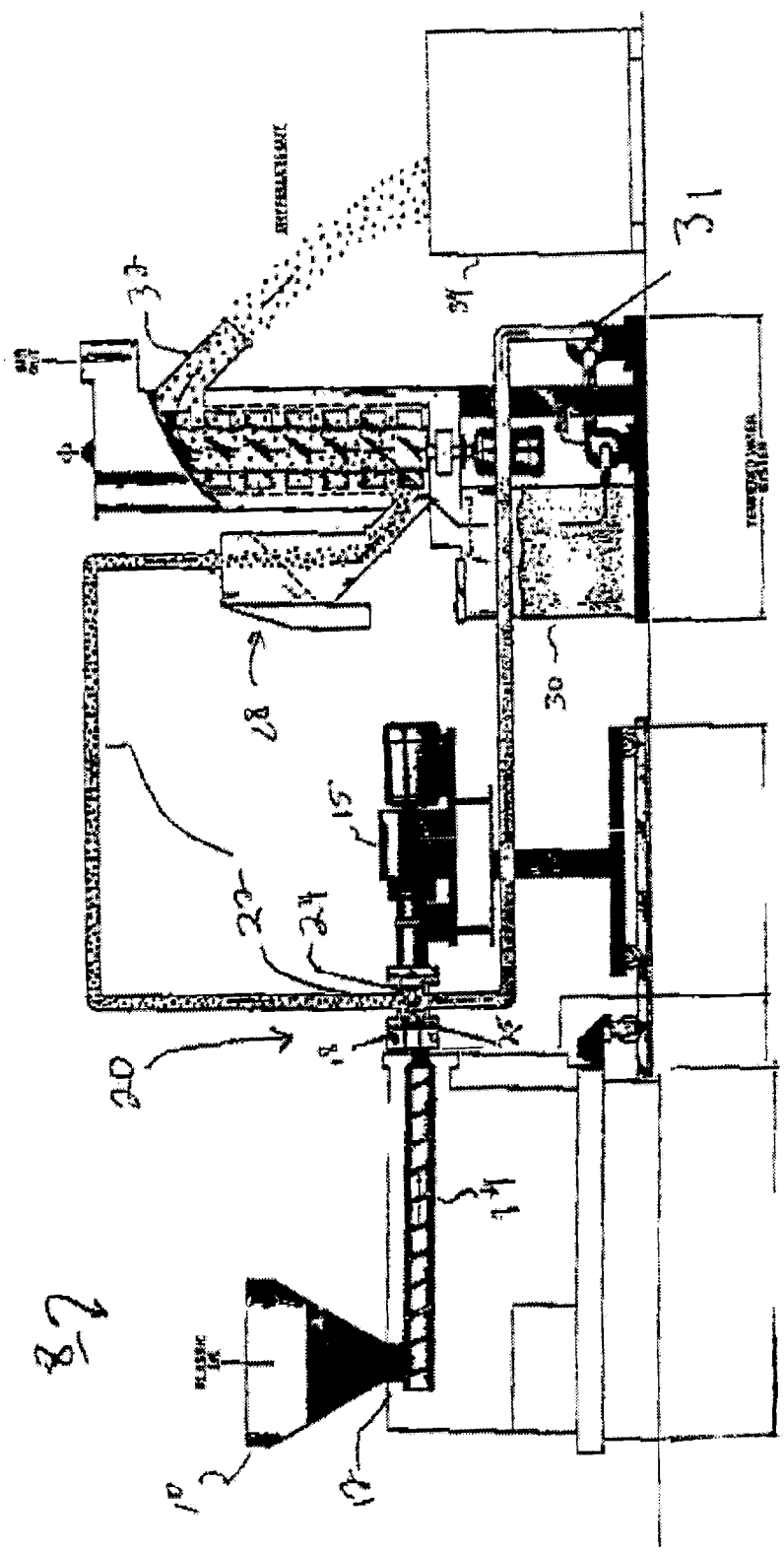
FIG. 1 is a process flow diagram for pelletizing impact modifiers according to an embodiment of the present invention.

Referring now to FIG. 1, an exemplary process flow 8 for pelletizing impact modifier powders according to one embodiment is shown. A hopper 10 includes a conventional means for introducing the impact modifier power therein. The impact modifier powder is fed through a throat 12 of hopper 10 and into an extruder 14. Extruder 14, as described further herein, can be a single screw extruder or a multiple screw extruder. Extruder 14 rotates, for example by means of a connection with a motor 15 or other type of mechanical output. The mechanical output of motor 15 can also be configured to rotate a die 18 and a cutting chamber 24 within an underwater pelletizer 20. A single motor or power source 15 can be employed, as shown, or a plurality of power sources (e.g., one for each rotating device) can be employed.

The type of impact modifier fed within hopper 10 can include any suitable impact modifier such as MBS, ABS, or ASA. In certain embodiments, the impact modifier is ABS, such as ABS available under the trade name HEOM007™, which is a commercially available from General Electric Company (Fairfield, Conn.), or CYCOLAC® C-29229, which is a commercially available from General Electric Company. In other detailed embodiments, the impact modifier employed is MBS, which is a commercially available from General Electric Company, or PARALOID® EXL-2691, which are commercially available from Rohm and Haas (Philadelphia, Pa.).

As different impact modifiers exhibit different chemical and physical properties, it will be understood by those skilled in the art that the various parameters and equipment configurations should be optimized for the particular material and output form of the impact modifier. It should be noted that the phrase "output form" refers to forms including, but not limited to, spools, sheets, pellets, or combinations comprising at least one of the foregoing forms.

Extruder 14 processes the impact modifier from generally an unrefined form to a highly viscous rubbery compound. "Unrefined form" refers to forms including, but not limited to, powders or pellets, wherein the pellets generally have fines and/or longs, or otherwise have a broad size distribution range. The rubbery compound that exits extruder 14 is processed through die 18. Die 18 includes one or more openings having shapes corresponding to the desired shape of the extruded material. In certain embodiments, the shape is cylindrical, rectangular, or flat. In one preferred embodiment, the cross-sectional shape of the extruder material is circular or elliptical, which is particularly suitable for pelletization. As is conventionally known, die 18 can include a plurality of openings. One or more of the plurality of openings may, during processing, become plugged with extrudate material. Additionally, one or more of the plurality of openings may be intentionally plugged to attain specific features and output forms. In certain detailed embodiments, one or more of the plurality of openings are selectively plugged depending on, for example, experimentation results.

The extruded material exiting die 18 is cut to the desired size by a pelletizer 20, such as an underwater pelletizer. Pelletizer 20 comprises a water flow portion 22 that quenches the extruded compound and cutting chamber 24 that generally rotates such that one or more blades 25 therein cut the extruded compound into pellets. The same motor 15 or mechanical output as employed to operate extruder 14 can for example, operate cutting chamber 24. Blades 25 are typically disposed proximate to the exit of die 18, and are configured such that the pellets are directed to the opposite side of cutting chamber 24 and are exposed to water from flow portion 22. Conventionally, blades 25 are configured by being angularly disposed.

In one exemplary process, the pellets are carried by water flow portion 22 into a separator 28. Within separator 28, a large portion of water from the portion 22 exits to a water tank 30 and the pellets are introduced into a dryer 32. A heat exchanger 31 generally cools the water from separator 28 to provide water into flow portion 22 at the appropriate temperature. Dryer 32 removes additional water from the pellets and outputs the pellets generally into a holding tank 34.

Although described herein as employing an underwater pelletizer 20, any type of pelletizer or cutting mill can be employed to cut the extruded material into pellets. For example, a hot die-face cutting mill can be employed. Alternatively, in embodiments where the output form of the extruded material is rolled or in sheets, for example, the pellet mill or pelletizer is eliminated.

Figure 2:
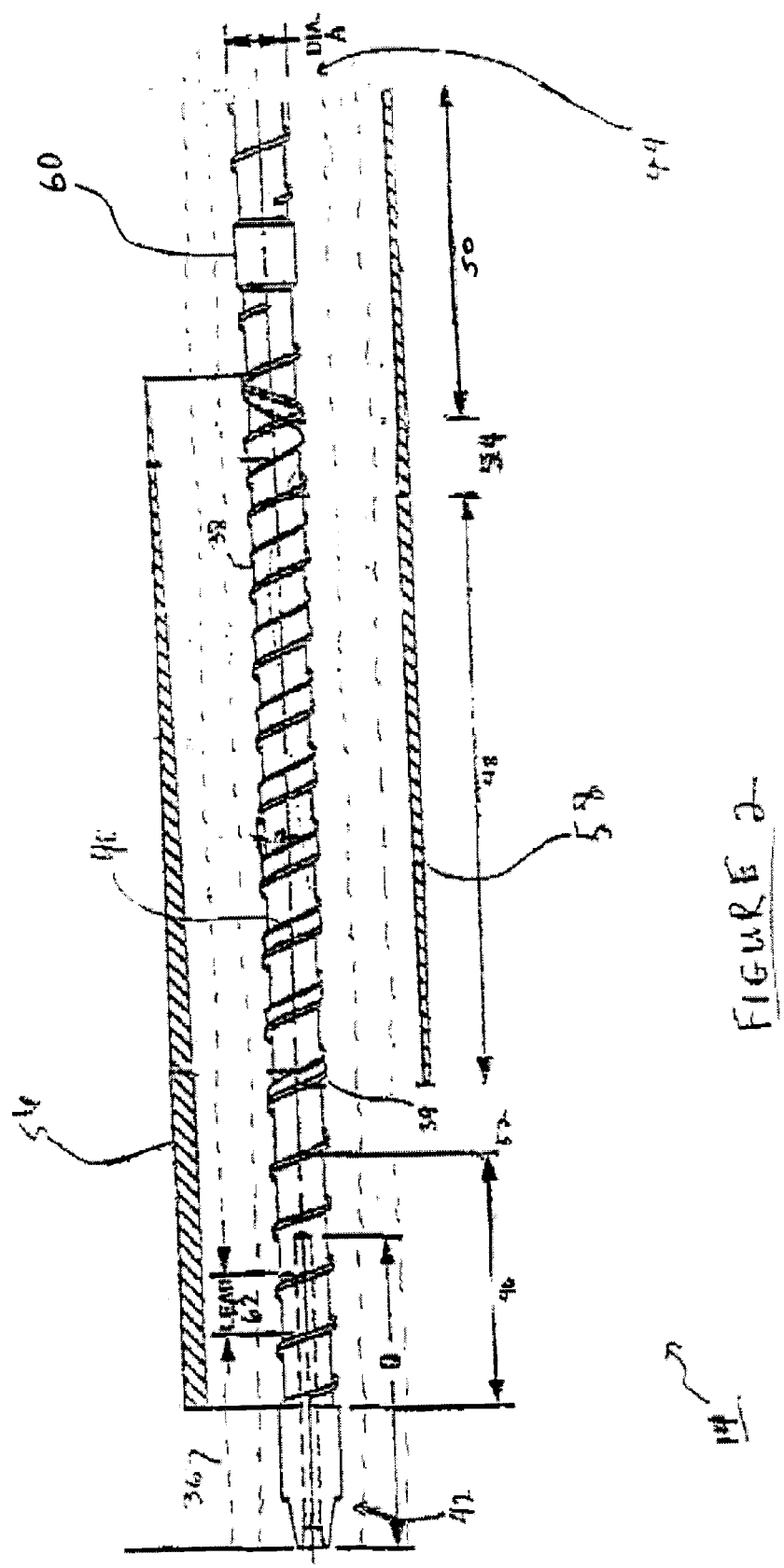
FIG. 2 is a schematic of an extruder employed for processing impact modifier material according to an embodiment of the present invention.

Referring now to FIG. 2, an exemplary embodiment of extruder 14 is shown. Different extruder configurations and types can be employed to form the spools, sheets, or pellets of impact modifier according to the present invention. Furthermore, while extruder 14 is depicted as a single screw extruder, it is contemplated that multiple screw extruders can be employed as further described herein. Additionally, while extruder 14 is depicted as a multiple flight extruder barrier extruder, wherein the flight configuration is chosen to cause air to escape from the material feed throat, it is contemplated that alternative air management schemes can be employed as further described herein.

Extruder 14 comprises a barrel 36 (shown in FIG. 2 by dashed lines) housing a screw 38. Barrel 36 is configured with a feed opening (not shown) positioned generally under throat 12 of hopper 10. Screw 38 includes a feed end 42 and a shank end 44. A first helical flight 39 and a second helical flight 40 protrude from at least portions of screw 38 generally between the feed end 42 and the shank end 44. For extrusion of plastics, screw 38 is typically constructed of a sturdy material such as steel or aluminum. In certain embodiments, screw 38 (optionally including flights 39 and/or 40) may be treated, e.g., by through hardening, case hardening, coating, or any combination comprising at least one of the foregoing treatments. For example, screw 38 may be coated with a suitable coating material such as chrome, colmonoy, any other suitable coating material, or any combination comprising at least one of the foregoing coating materials. Such treatment may, for example, to reduce friction and extend the operable life of screw 38. Preferably, the surface of screw 38 is polished or otherwise finished such that the surface quality is high (e.g., a machine rating of 16, 8, 4, or other value generally less abrasive than a surface having a machine rating of 16). Please provide other data.

Feed end 42 is attached to an output shaft of a motor (not shown), and shank end 44 is disposed on a pivotal mount (not shown). Shank end 44 typically includes one or more key configurations or splines to facilitate, for example, a secure interference engagement with the motor output shaft, or other conventional rotatable engagement. The motor is capable of operating screw 38 at various speeds (typically measured in revolutions perminute, or RPM), which speeds are controlled by conventional means. In the depicted embodiment, screw 38 is rotated clockwise on its longitudinal axis such that flights 39, 40 generally drive material in the direction from feed end 42 toward shank end 44 to an output opening, for example (not shown).

Flights 39, 40 are characterized by depths. The flight depths are represented in FIG. 2 a depth gauge 56 for flight 39 and a depth gauge 58 for flight 40. In general, flights or flight portions having greater depths also have higher volumetric conveyance capacity. However, higher depths also result in higher turbulence and increased mechanical interference in the material flow. This can increase the likelihood of scorching or other type of degradation. Therefore, it is preferred to use screw 38 having optimized flight dimensions, as detailed herein.

The flights typically extend from a solid body to form screw 38. In certain embodiments, the flights are treated (i.e., separate from any treatment applied to the remainder of screw 38) e.g., by case hardening, coating, or any combination comprising at least one of the foregoing treatments. For example, flights 39 and/or 40 may be coated with a suitable coating material such as chrome, colmonoy, any other suitable coating material, or any combination comprising at least one of the foregoing coating materials.

The flights are additionally characterized by a lead 62 (also commonly referred to as the "helical angle"), which is the axial distance between flight portions of the particular flight. The lead 62 may also be a factor in determining the volumetric conveyance of the feed material. Generally, as the lead 62 increases, more feed material can be conveyed with less motor work.

The region between portions of flight 39 is referred to as the solids channel. Further, the region between portions of flight 40 is referred to as the consolidation channel.

Screw 38 includes various sections, including a feed section 46 (or solids handling section) that receives the impact modifier in unrefined form from throat 12 of hopper 10. Feed section 48 generally consolidates and increases the bulk density of the material as it is processed into a first transition section 52. The material is transported to a consolidation section 48, where the material is generally plasticized. From consolidation section 48, the material is transported through a second transition section 54 to a meter section 50, wherein the material is suitably pressurized.

Feed section 46 comprises flight 39 configured as a barrier flight. One feature that is particularly important in a barrier screw and related in part to the flight 39 is referred to as the "undercut". Generally, screw 38 is configured such that flight 39 has a distance from the outermost flight portion to the main body portion of screw 38 before (i.e., in the transport direction) a portion of flight 39 that is less than the distance from the outermost flight portion to the main body portion of screw 38 after the same portion of flight 39. This generally allows for material having higher bulk densities to traverse past the portion of flight 39 (and flight 40 in other sections of screw 38), while material having lower bulk densities remains in the solids channel before the portion of flight 39 and is subject to further processing.

The transition section 52 is between feed section 46 and the consolidation section 58. The transition section 52 comprises flight 39 and may also comprise the beginning portion of flight 40 (e.g., as shown by dashed lines in FIG. 2). However, it is understood that transition section 52 may be minimized or eliminated in certain types of extruder screws.

Within the consolidation section 48, the material is generally worked to a viscous rubbery compound and is fed into the second transition section 54. This is accomplished by provision of heat sufficient to soften the shells of the core and shell material and mild working of the impact modifier material. Note that in certain embodiments, as depicted in FIG. 2, the flight depth of flight 39 (see depth gauge 56) decreases in the direction of transport. Further, the flight depth of flight 40 (see depth gauge 58) increases from a lowest depth at the beginning of consolidation section 48 to a highest depth at the end portion of consolidation section 48.

The configuration and dimensions of the overlapping solids channel and consolidation channel allow for the impact modifier material to plasticize when suitable rotational speeds, feed quantities, and temperatures are used. The action of the material within the separate overlapping channels is effective to maintain a suitable material working level that consolidates the material with minimal or no scorching or degradation of the material's core and shell structure. Further, the flights 39, 40 may be configured to impart a certain amount of friction to the material.

In order to properly consolidate the material, softening temperatures of the material is attained. At the appropriate softening temperature, which temperature varies depending on the particular material and process parameters, the shell of the core and shell polymer softens as to allow a plurality of shells to fuse together without affecting the typically rubbery cores. Preferably, the softening temperature is selected such that reaction of the core portions of the core and shell impact modifier material is minimized. More preferably, the softening temperature is selected such that reaction of the core portions is completely eliminated.

To attain the softening temperature, in certain embodiments, the frictional heat imparted to the material from screw 38 is sufficient. In other embodiments, one or more heating devices are employed to elevate the temperature. In further embodiments, frictional heat imparted to the material from screw 38 is excessive, thereby requiring one or more cooling device. In still further embodiments, the frictional heat imparted to the material from screw 38 is initially insufficient, thus one or more heating devices are employed, but the heat imparted from screw 38 is conjunction with the one or more heating devices is excessive, therefore one or more cooling devices are also employed.

The one or more heater devices are typically electric heaters disposed around barrel 36. The one or more cooling devices are typically fans or water cooling heat exchangers disposed around barrel 36. To approximate the temperature of the material within barrel 36, one or more thermocouples are positioned upon barrel 36. In certain embodiments, the thermocouples are interfaced with a microprocessor or other control device, which in turn operates the heater device and/or cooling device to accommodate a predetermined temperature profile. To optimize attainment of the predetermined temperature profile, the one or more heater devices and/or the one or more cooling devices are divided in to a plurality of zones. The plurality of zones can be controlled independently or integrally. Typically, each zone includes one or more thermocouples therein mounted on barrel 36. Additionally, certain embodiments employ thermocouples or other temperature measurement means and/or pressure transducers or other pressure measurement means at between die 18 and the exit of extruder 14 to determine the temperature and/or pressure of the material exiting extruder 14.

The second transition section 54 is between the consolidation section 48 and the meter section 50. The second transition section 54 comprises flight 40, which has a depth (see depth gauge 58) that generally decreases to a depth approximately between the lowest and highest depth of consolidation section 48. However, it is understood that the second transition section 54 may be minimized or eliminated in certain types of extruder screws.

Within meter section 50, pressure is increased generally to a point sufficient to be fed into the next processing device, for example, die 18 and underwater pelletizer 20 as described generally above with respect to FIG. 1. Meter section 50 comprises flight 40, which has a depth (see depth gauge 58) that generally remains constant depth within meter section 50.

A fluted portion 60 is optionally provided in meter section 50 to allow for additional distribution and mixing of the material. The additional distribution and mixing allows the material to be dispersed at a relatively homogeneous temperature and composition (e.g., if additional modifiers, fillers or colors are included in the feed). Further, meter section 50 may also comprise a reverse flight portion. The reverse flight portion generally allows for additional processing of the material by providing a means for a portion of the material to work and/or mix by backing up the material. Generally, the material will not pass the reverse flight portion unless plasticized. That is, the reverse flight portion assists in holding the flow and ensuring that sufficient work is imparted to the material to allow for plastication.

One consideration that must be accounted for in processing of impact modifier material is the prevention of air (oxygen) introduction in the extruder, and also the elimination of air from the solid feed. This generally minimizes or prevents scorching or other degradation of the impact modifier material typically due to the reaction of oxygen and the impact modifier material at the temperatures and pressures within extruder 14. The barrier screw configuration of screw 38 provides a means to allow air to escape generally out of feed throat 12. Further, due to the direction of air pressure out of feed throat 12, air is prevented from entering the extruder 14. As screw 38 is turned and the extrudate traverses in the direction from the feed section 46 to the metering section 50, air and any moisture within the material is allowed to escape through throat 12.

Other means may be provided to allow air and moisture to escape. For example, a vacuum device can be positioned as to assist in removal of air from throat 12. Alternatively, in certain embodiments, one or more vents can be provided upon the body of extruder 14 (e.g., within barrel 36). These vents are atmospheric (i.e., no vacuum assist) or vacuum, and are generally provided downstream (e.g., within consolidation section 48 or meter section 50). In further embodiments, one or more atmospheric vents and one or more vacuum vents can be provided, generally at opposite ends of screw 38.

Preferably, a safety mechanism is provided in conjunction with either the barrier configuration or the alternative air control scheme. Such a mechanism activates when air is prone to enter extruder 14. For example, air may enter the system when feed is interrupted due to failure to refill feed hopper 10, when a power outage or deficiency causes the screw 38 to stop rotating, or when a power outage or deficiency causes one or more vacuum devices (when employed) to fail. In one embodiment, the safety mechanism comprises introduction of nitrogen gas at a low rate to force any oxygen from extruder 14. In another embodiment, the extruder operation is stopped, and optionally nitrogen gas is subsequently introduced.

According to certain embodiments, extruder 14 has a low compression ratio (a so-called "mild screw"). The compression ratio as used with respect to single screw extruders refers to the depth of the flight at the feed section over the depth of the flight at the meter section. Generally, the compression ratio is about 1 to about 10, preferably about 1.5 to about 5, and more preferably about 2 to about 4.

Figure 3:
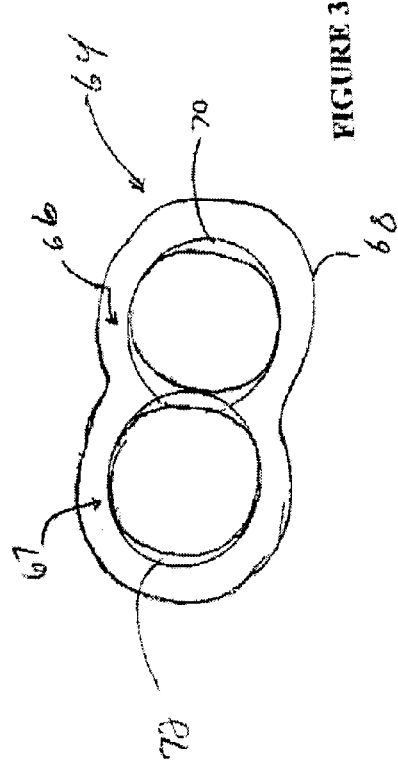
FIG. 3 is a cross sectional view of a twin-screw extruder according to another embodiment of the present invention.

Referring now to FIG. 3, a sectional view of a twin-screw extruder 64 provided. A pair of screws 66, 67 are arranged alongside one another and are co-rotated (i.e., both rotated in the same direction) within a barrel 68. Barrel 68 generally has a cross-sectional shape of a numeral eight (a so-called "side-eight" configuration). Typically, at least a portion of screws 66, 67 are configured such that their flights 70, 72, respectively, are bi-lobe type flights having generally elliptical cross sectional shapes. Flights 70, 72 intermesh such that while the compound is being consolidated, the flights are wiping each other thereby cleaning material that would otherwise be trapped at the base of the flights.

Certain extruders may be assembled from a plurality of screw elements arranged on a solid shaft. Typically, the elements are interconnected with splines or keyways. Therefore, a variety of combination of flight characteristics, including, but not limited to, lead dimensions, flight depths, undercuts, and flight orientation, can be facilitated by arrangement of various screw elements.

In certain embodiments, the screws of extruder 64 vary in conjunction with the screw section (e.g., feed section, plasticating or consolidating sections, or metering section). For example, the feed section may be configured with a single lobe flight, generally to maximize bulk solid conveyance while minimizing friction imparted to the material. The feed section or the plasticating or consolidating section can also be configured with elements having varying undercut to modify the solids handling.

To attain the desired consistency of the composition, the plasticating or consolidating section may be configured with a bi-lobe flight. Additionally, the plasticating or consolidating section may comprise one or more elements having a tri-lobe flight. In addition to the variation in the type of flight, certain lobe dimensions (e.g., lobe height, lobe width, lobe thickness, etc.) may also vary for different materials and rates.

The residence time for the material can also be an important factor in the effective extrusion of impact modifiers or other core and shell materials. The residence time is the time that a unit (e.g., a volumetric unit) of material remains within the extruder. Generally, shorter residence time is more conducive to effective extrusion of core and shell material. In certain embodiments, the residence time of the material is less than three (3) minutes. In more preferred embodiments, the residence time is less than one (1) minute. In further preferred embodiments, for example, in twin-screw extruders described above, the residence time is less than thirty (30) seconds.

The residence time may be adjusted by various methods such as varying the rotational speed of the screw or screws of the extruder, using a shorter extruder or introducing the feed material at a downstream location on the extruder. In preferred embodiments, the residence time is selected by using extruders of suitable lengths. However, existing extruders (e.g., having excess length) may also be employed, wherein the feed is introduced downstream. The portion of the extruder upstream from the feed point generally remains void of feed or extrudate, however, air, or optionally a control gas, may be allowed and/or introduced in the portion upstream from the feed point.

In the following non-limiting examples, various parameters and output rates are provided. The output rates all result in unscorched, undegraded impact modifier in a suitable output form as indicated.

EXAMPLE 1

A single screw extruder similar in arrangement to that described with respect to FIG. 2 was employed to process CYCOLAC® C-29229 ABS terpolymer powder. The extruder employed was a single screw barrier-type screw manufactured by Davis Standard. The screw had the following attributes:

Screw diameter: 2.494 inches (63.35 mm)

Screw length: 87.43 inches (222 cm)

Feed section length: 17.12 inches (43.48 cm)

First transition section length: 2.5 inches (63.5 mm)

Consolidation section length: 35 inches (88.9 cm)

Second transition section length: 3.5 inches (88.9 mm)

Meter section length: 18.625 inches (47.3 cm)

Fluted section length: 4.875 inches (123.8 mm)

Solids channel flight depth (feed section through first transition section): 0.48 inches (12.2 mm)

Solids channel flight depth (within the second transition section): 0.04 inches (1.0 mm)

Consolidation channel flight depth (within the first transition section): 0.15 inches (3.8 mm)

Consolidation channel flight depth (at the end of the consolidation section): 0.30 inches (7.6 mm)

Meter section flight depth: 0.19 inches (4.8 mm)

Flight lead: 2.5 inches (63.5 mm)

Compression ratio (Solids channel flight depth at feed section: consolidation channel flight depth at meter section): 2.54

The barrel was divided into six temperature zones that were individually set and individually measured via discreet thermocouples. An additional temperature zone was provided at the die plate. The die had six unplugged holes at the start of the operation, one of which became clogged during the early stages of the process. Therefore, there were five open holes each having a diameter of 0.156 inches (3.96 mm). A Gala SLC-6 underwater pelletizer, having a cutter with 6 angular blades, was used to pelletize the extruded material. The following Table 1 summarizes the process parameters and pellet output data:

TABLE 1

| | |
|---|---|
| Melt Temperature* | 458 |
| Extruder speed, RPM | 140 |
| Extruder motor load, Amperes, "Amps" | 52 |
| Zone 1, Temperature, ° C. (° F.) | 126.1 (259) |
| Zone 2, Temperature, ° C. (° F.) | 131.7 (269) |
| Zone 3, Temperature, ° C. (° F.) | 135 (275) |
| Zone 4, Temperature, ° C. (° F.) | 138.9 (282) |
| Zone 5, Temperature, ° C. (° F.) | 146.1 (295) |
| Zone 6, Temperature, ° C. (° F.) | 149.4 (301) |
| Die Plate, Temperature, ° C. (° F.) | 176.7 (350) |
| Extruder Output Material Pressure, kilograms per square cm, "kscm" (pounds per square inch, "psi") | 134.3 (1910) |
| Die Load, Amps | 9.0 |
| Die Output Material Pressure, kscm (psi) | 119.5 (1700) |
| Pelletizer Motor Load, Amps | 2.4 |
| Cutter Speed, RPM | 1532 |
| Water Temperature, ° C. (° F.) | 65 (149) |
| Water Flow Rate (gallons per minute, "GPM") | 227.1 (60) |
| Dryer Speed, RPM | 1054 |
| Pellet Rate, kg per hour (pounds per hour) | 63.5 (170) |
| Weight of 100 Pellets, grams | 2.83 |

*The material melt temperature is measured at the end of the screw before the material enters the die for further processing.

EXAMPLE 2

Figure 4:
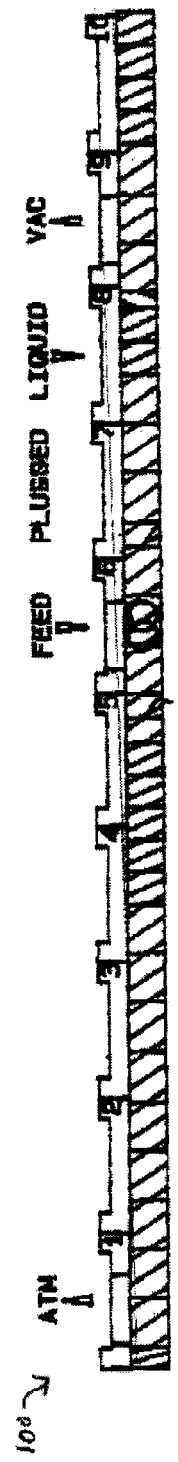
FIG. 4 is a schematic of a twin-screw extruder in accordance with one embodiment.

Referring to FIG. 4, a schematic of a twin screw extruder 100 is detailed. Extruder 100 was used to process PARALOID® EXL-2691 MBS powder. Extruder 100 comprised ten (10) barrel sections or zones (wherein material exiting zone 10 is fed to a die section, not shown), and a pair of 40 mm screws within the barrel formed from the barrel sections. Each screw comprised thirty-four (34) elements. The type, lead, and length of each of the screw elements are detailed in Table 2, wherein the ascending numerals for the elements represent the elements from left to right, as viewed in FIG. 4.

TABLE 2

| ELEMENT | LEAD | LENGTH | TYPE (all bi-lobe unless indicated) |
|---|---|---|---|
| 1 | 25 mm | 25 mm | right |
| 2 | 60 | 60 | right |
| 3 | 60 | 60 | right |
| 4 | 60 | 60 | right |
| 5 | 60 | 60 | right |
| 6 | 60 | 60 | right |
| 7 | 60 | 60 | right |
| 8 | 60 | 60 | right |
| 9 | 60 | 60 | right |
| 10 | 60 | 60 | right |
| 11 | 40 | 40 | right |
| 12 | 40 | 40 | right |
| 13 | 40 | 40 | right |
| 14 | 40 | 40 | right |
| 15 | 40 | 40 | right |
| 16 | 60 | 30 | right |
| 17 | 60 | 30 | transition |
| 18 | 60 | 60 | single lobe |
| 19 | 60 | 60 | single lobe |
| 20 | 60 | 60 | single lobe |
| 21 | 60 | 30 | transition |
| 22 | 60 | 60 | right |
| 23 | 60 | 60 | right |
| 24 | 60 | 60 | right |
| 25 | 40 | 40 | right |
| 26 | 40 | 40 | right |
| 27 | 40 | 20 | left |
| 28 | 60 | 60 | right |
| 29 | 60 | 60 | right |
| 30 | 60 | 60 | right |
| 31 | 40 | 40 | right |
| 32 | 40 | 40 | right |
| 33 | 40 | 40 | right |
| 34 | 40 | 40 | right |

The feed is introduced in a feed portion at the sixth barrel section, corresponding with approximately screw elements 18–20. These elements are single lobe right-handed flight screw elements, which generally provide solid conveyance in the transport direction. Note that elements 1–16 are generally within extruder sections that are void of material. Further, element 17 is a transition portion upstream from the feed portion. Element 17 generally has a higher lead as compared to the length.

A second transition portion at element 21 downstream of the feed portion is configured similar to element 17. Element 21 functions to provide a gradual increase in the amount of work by changing from a single lobe flight used in the feed portion to a bi-lobe flight.

A plasticating portion downstream of element 21 comprises a bi-lobe right handed flight formed with elements 22–26. The dimensions within the plasticating portion vary generally to increase the work applied to the material. Element 27 was a left handed element, generally for enhancing mixing prior to a transport portion. The transport portion comprised elements 28–34, generally of decreasing lead and length.

The extrudate was processed through a die at the output of the extruder. A pelletizer, having a cutter with angular blades, was used to pelletize the extruded material. The following Table 3 summarizes the process parameters and pellet output data:

TABLE 3

| | Run Number | | | | | |
|---|---|---|---|---|---|---|
| | 1 | 2 | 3 | 4* | 5 | 6 |
| Feed Rate, kg per hour (pounds per hour) | 368.2 (986.5) | 35.5 (95) | 48.5 (130) | 48.5 (130) | 63.5 (170) | 82.1 (220) |
| Melt Temperature, ° C. (° F.) | 200 (392) | 208 (406.4) | 214 (417.2) | 221 (429.8) | 207 (404.6) | 208 (406.4) |
| Extruder speed, RPM | 94 | 120 | 170 | 170 | 241 | 302 |
| Extruder motor load, % Torque | 61 | 50 | 57 | 56 | 52 | 53 |
| Zone 1, ° C. (° F.) | 53.5 (128) | 61.1 (142) | 37.8 (100) | 37.8 (100)(set) | 37.8 (100) | 37.8 (100) |
| Zone 2, | 78.9 | 78.9 | 41.7 | 37.8 | 41.1 | 41.1 |

TABLE 3-continued

| | Run Number | | | | | |
|---|---|---|---|---|---|---|
| | 1 | 2 | 3 | 4* | 5 | 6 |
| ° C. (° F.) | (174) | (174) | (107) | (100)(set) | (106) | (106) |
| Zone 3, | 92.8 | 92.2 | 49.4 | 48.9 | 49.4 | 49.4 |
| ° C. (° F.) | (199) | (198) | (121) | (120)(set) | (121) | (121) |
| Zone 4, | 93.3 | 93.3 | 55 | 48.9 | 51.7 | 53.3 |
| ° C. (° F.) | (200) | (200) | (131) | (120)(set) | (125) | (128) |
| Zone 5., | 90 | 93.3 | 65 | 65.6 | 65 | 65 |
| ° C. (° F.) | (194) | (200) | (149) | (150)(set) | (149) | (149) |
| Zone 6, | 140 | 141.7 | 81.7 | 82.2 | 82.2 | 80 |
| ° C. (° F.) | (284) | (287) | (179) | (180)(set) | (180) | (176) |
| Zone 7, | 135 | 132.2 | 120.6 | 126.7 | 127.2 | 126.1 |
| ° C. (° F.) | (275) | (270) | (249) | (260)(set) | (261) | (259) |
| Zone 8, | 152.8 | 151.7 | 151.1 | 143.3 | 155.5 | 153.3 |
| ° C. (° F.) | (307) | (305) | (304) | (290)(set) | (312) | (308) |
| Zone 9, | 147.2 | 197.2 | 159.4 | 160 | 160.6 | 160 |
| ° C. (° F.) | (297) | (387) | (319) | (320)(set) | (321) | (320) |
| Zone 10, | 182.2 | 182.2 | 186.1 | 182.2 | 183.3 | 183.3 |
| ° C. (° F.) | (360) | (360) | (367) | (360)(set) | (362) | (362) |
| Die Pressure, kscm (psi) | 77.3 (1100) | 70.3 (1000) | 84.4 (1200) | 77.3 (1100) | 66.8 (950) | 70.3 (1000) |
| Vacuum, mm of water (inches of water) | 660.4 (26) | 635 (25) | 635 (25) | 635 (25) | 609.6 (24) | 609.6 (24) |

*Run #4 employed a four hole die.

EXAMPLE 3

The apparatus described with respect to Example 3 was employed to pelletize HEOM007™ ABS dusted powder. The following Table 4 summarizes the process parameters and output data:

TABLE 4

| | Run Number | |
|---|---|---|
| | 1 | 2 |
| Feed Rate, kg per hour (pounds per hour) | 30.1 (80.5) | 55.99 (150) |
| Melt Temperature, ° C. (° F.) | 196 (384.8) | 208 (406.4) |
| Extruder speed, RPM | 110 | 200 |
| Extruder motor load % Torque | 50 | 55 |
| Zone 1 Temperature, ° C. (° F.) | 37.8 (100) | 37.8 (100) |
| Zone 2 Temperature, ° C. (° F.) | 41.1 (106) | 41.1 (106) |
| Zone 3 Temperature, ° C. (° F.) | 49.4 (121) | 44.4 (122) |
| Zone 4 Temperature, ° C. (° F.) | 50 (122) | 53.9 (129) |
| Zone 5 Temperature, ° C. (° F.) | 64.4 (148) | 65 (149) |
| Zone 6 Temperature, ° C. (° F.) | 76.7 (170) | 85 (185) |
| Zone 7 Temperature, ° C. (° F.) | 127.2 (261) | 131.7 (269) |
| Zone 8 Temperature, ° C. (° F.) | 156.6 (314) | 160 (320) |
| Zone 9 Temperature, ° C. (° F.) | 162.8 (325) | 161.1 (322) |
| Zone 10 Temperature, ° C. (° F.) | 183.9 (363) | 183.3 (362) |
| Die Pressure, kscm (psi) | 56.2 (800) | 62.6 (890) |
| Vacuum, mm of water (inches of water) | 635 (25) | 609.6 (24) |

EXAMPLE 4

Figure 5:
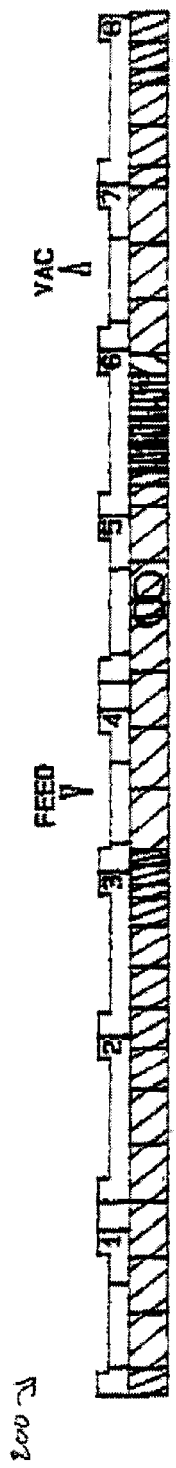
FIG. 5 is a schematic of a twin-screw extruder in accordance with another embodiment.

Referring to FIG. 5, a schematic of a twin screw extruder 200 is detailed. Extruder 200 was used to process HEOM007™ ABS dusted powder. Extruder 200 comprised eight (8) barrel sections and a pair of 58 mm screws within the barrel formed from the barrel sections. Each screw comprised thirty-five (35) elements. The identification, type, lead, and length of each of the screw elements are detailed in Table 5, wherein the ascending numerals for the elements represent the elements from left to right as viewed in FIG. 5.

TABLE 5

| ELEMENT | LEAD | LENGTH | TYPE (all bi-lobe unless indicated) |
|---|---|---|---|
| 1 | 40 | 40 | right |
| 2 | 80 | 80 | right |
| 3 | 80 | 80 | right |
| 4 | 80 | 80 | right |
| 5 | 80 | 80 | right |
| 6 | 80 | 80 | right |
| 7 | 60 | 60 | right |
| 8 | 60 | 60 | right |
| 9 | 60 | 60 | right |
| 10 | 60 | 60 | right |
| 11 | 40 | 40 | right |
| 12 | 40 | 20 | right |
| 13 | 30 | 30 | right |
| 14 | 20 | 20 | right |
| 15 | 92 | 92 | undercut |
| 16 | 92 | 92 | undercut |
| 17 | 80 | 80 | undercut |
| 18 | 80 | 80 | undercut |
| 19 | 80 | 80 | undercut |
| 20 | 80 | 80 | right |
| 21 | 60 | 30 | right |
| 22 | 40 | 20 | right |
| 23 | 45 | 40 | kneading element, transition |
| 24 | 45 | 40 | kneading element, eccentric |
| 25 | 45 | 60 | kneading element, right |
| 26 | 60 | 30 | left |
| 27 | 80 | 80 | right |
| 28 | 80 | 80 | right |
| 29 | 80 | 80 | right |
| 30 | 60 | 30 | right |
| 31 | 60 | 60 | right |
| 32 | 60 | 60 | right |
| 33 | 40 | 20 | right |
| 34 | 40 | 40 | right |
| 35 | 40 | 40 | right |

The feed was introduced in a feed portion at the fifth barrel section, corresponding with approximately screw elements 15–19. These elements were right handed bi-lobe elements having an undercut particularly suited for solid conveyance. Note that elements 1–14 were generally within extruder sections that were void of material (i.e., upstream of the feed throat). Elements 20–22 had decreasing leads and lengths to convey material to kneading elements 23–25.

A plasticating portion includes the kneading elements 23–25. Element 23 is a bi-lobe transition kneading element, and element 24 was a tri-lobe (eccentric) kneading element. Element 25 is also a kneading element, wherein the length increases as compared to element 24. Element 26 was a left handed element, generally for enhancing mixing prior to a transport portion. The transport portion comprised elements 27–35, generally of decreasing lead and length.

The extrudate was processed through a die at the output of the extruder. A pelletizer, having a cutter with angular blades, was used to pelletize the extruded material. The following Table 6 summarizes the process parameters and output data:

TABLE 6

| | Run Number | | | | |
|---|---|---|---|---|---|
| | 1 | 2 | 3 | 4* | 5 |
| Feed Rate, kg per hour | 112 | 194.1 | 186.6 | 186.6 | 216.5 |
| (pounds per hour) | (300) | (520) | (500) | (500) | (580) |
| Melt Temperature, °C. (°F.) | 178.9 | 179.4 | 180 | 180.6 | 180.6 |
| | (354) | (355) | (356) | (357) | (357) |
| Extruder speed, RPM | 150 | 200 | 200 | 209 | 235 |
| Extruder motor load, % Torque | 56 | 71 | 72.4 | 70.3 | 73.5 |
| Zone 1 Temperature, °C. (°F.) | 37.8 | 37.8 | 37.8 | 37.8 | 37.8 |
| | (100) | (100) | (100) | (100) | (100) |
| Zone 2 Temperature, °C. (°F.) | 37.8 | 37.8 | 37.8 | 37.8 | 37.8 |
| | (100) | (100) | (100) | (100) | (100) |
| Zone 3 Temperature, °C. (°F.) | 65.6 | 65.6 | 65.6 | 65 | 66.4 |
| | (150) | (150) | (150) | (149) | (151) |
| Zone 4 Temperature, °C. (°F.) | 176.7 | 181.7 | 165 | 160 | 137.2 |
| | (350) | (395) | (329) | (320) | (279) |
| Zone 5 Temperature, °C. (°F.) | 146.1 | 148.3 | 147.2 | 143.3 | 141.1 |
| | (295) | (299) | (297) | (290) | (286) |
| Zone 6 Temperature, °C. (°F.) | 151.7 | 150.6 | 146.1 | 147.2 | 149.4 |
| | (305) | (303) | (295) | (297) | (301) |
| Die Temperature, °C. (°F.) | 176.7 | 176.7 | 176.7 | 176.7 | 176.7 |
| | (350) | (350) | (350) | (350) | (350) |
| Die Pressure, kscm (psi) | 46.4 | 47.8 | 47.9 | 51.3 | 50.6 |
| | (660) | (680) | (682) | (730) | (720) |
| Vacuum, mm of water | 711.2 | 711.2 | 711.2 | 711.2 | 711.2 |
| (inches of water) | (28) | (28) | (28) | (28) | (28) |

EXAMPLE 5

The apparatus described with respect to Example 4 was employed to pelletize PARALOID® EXL-2691 MBS powder. The following Table 7 summarizes the process parameters and output data:

TABLE 7

| | Run Number | | | | |
|---|---|---|---|---|---|
| | 1 | 2 | 3 | 4* | 5 |
| Feed Rate, kg per hour | 112 | 194.1 | 186.6 | 186.6 | 216.5 |
| (pounds per hour) | (300) | (520) | (500) | (500) | (580) |
| Melt Temperature, °C. (°F.) | 178.9 | 179.4 | 180 | 180.6 | 180.6 |
| | (354) | (355) | (356) | (357) | (357) |
| Extruder speed, RPM | 150 | 200 | 200 | 209 | 235 |
| Extruder motor load, % Torque | 56 | 71 | 72.4 | 70.3 | 73.5 |
| Zone 1 Temperature, °C. (°F.) | 37.8 | 37.8 | 37.8 | 37.8 | 37.8 |
| | (100) | (100) | (100) | (100) | (100) |
| Zone 2 Temperature, °C. (°F.) | 37.8 | 37.8 | 37.8 | 37.8 | 37.8 |
| | (100) | (100) | (100) | (100) | (100) |
| Zone 3 Temperature, °C. (°F.) | 65.6 | 65.6 | 65.6 | 65 | 66.1 |
| | (150) | (150) | (150) | (149) | (151) |
| Zone 4 Temperature, °C. (°F.) | 176.7 | 181.7 | 165 | 160 | 137.2 |
| | (350) | (395) | (329) | (320) | (279) |
| Zone 5 Temperature, °C. (°F.) | 146.1 | 148.3 | 147.2 | 143.3 | 141.4 |
| | (295) | (299) | (297) | (290) | (286) |
| Zone 6 Temperature, °C. (°F.) | 151.7 | 150.6 | 146.1 | 147.2 | 144.4 |
| | (305) | (303) | (295) | (297) | (301) |
| Die Temperature, °C. (°F.) | 176.7 | 176.7 | 176.7 | 176.7 | 176.7 |
| | (350) | (350) | (350) | (350) | (350) |
| Die Pressure, kscm (psi) | 46.4 | 47.8 | 47.9 | 51.3 | 50.6 |
| | (660) | (680) | (682) | (730) | (720) |
| Vacuum, mm of water | 711.2 | 711.2 | 711.2 | 711.2 | 711.2 |
| (inches of water) | (28) | (28) | (28) | (28) | (28) |

EXAMPLE 6

Referring to FIG. 6, a plot for a twin screw extruder 300 is detailed. Extruder 300 was used to process HEOM007™ ABS Powder. The extruder 300 comprises nine barrel sections and a pair of 69 mm screws within the barrel formed from the barrel sections. The extruder 300 included both an atmospheric vent and a vacuum vent. Each screw comprised twenty-five (25) elements. Each section or zone has discreet temperature systems (i.e., thermocouple and heater device and/or cooling device). Zone 9 comprised an adaptor generally to convert the extrusion shape from the side-eight configuration (shown in FIG. 3) to a circular cross sectional shape to facilitate processing by the die. The identification, type, lead, and length of each of the screw elements are detailed in Table 8, wherein the ascending numerals for the elements represent the elements from left to right as viewed in FIG. 6, also wherein the values are provided as ratios compared to the screw diameter.

TABLE 8

| ELEMENT | LENGTH (L/D) | LEAD (L/D) | TYPE |
|---|---|---|---|
| 1 | 0.75 | 0.75 | Forward Feed (FF) |
| 2 | 1.5 | 1.5 | FF |
| 3 | 1.5 | 1.5 | FF |
| 4 | 1.5 | 1.5 | FF |
| 5 | 1.5 | 1.5 | FF |
| 6 | 1.5 | 1.5 | FF |
| 7 | 1.5 | 1.5 | FF |
| 8 | 1.25 | 1.25 | FF |
| 9 | 1.25 | 1.25 | FF |
| 10 | 1 | 1 | FF |
| 11 | 0.75 | 0.75 | FF |
| 12 | 1.5 | 1.5 | Large Volume Forward Feed (LVFF) |
| 13 | 1.5 | 1.5 | LVFF |
| 14 | 1.5 | 1.5 | FF |
| 15 | 1.5 | 1.5 | FF |
| 16 | 1.25 | 1.25 | FF |
| 17 | 1 | 1 | FF |
| 18 | 1 | 1 | FF |
| 19 | 0.5 | 1 | Reverse Feed (RF) |
| 20 | 1.5 | 1.5 | FF |
| 21 | 1.5 | 1.5 | FF |
| 22 | 1.5 | 1.5 | FF |
| 23 | 1.25 | 1.25 | FF |
| 24 | 1 | 1 | FF |
| 25 | 1 | 1 | FF |

The following data summarizes processing of HEOM007™ ABS powder with extruder 300 detailed:

TABLE 9

| | Run Number | | | |
|---|---|---|---|---|
| | 1 | 2 | 3 | 4 |
| Feed Rate Set, kg per hour | 167.0 | 261.3 | 223.9 | 205.2 |
| (pounds per hour) | (450) | (700) | (600) | (550) |
| Feed Rate Actual, kg per hour | 169.4 | 277.3 | 256.3 | 226.4 |
| (pounds per hour) | (454.1) | (743.1) | (686.7) | (606.6) |
| Material Melt Temperature, °C. | 186.1 | 186.1 | 185.6 | 185 |
| (°F.) | (367) | (367) | (366) | (365) |
| Extruder speed, RPM | 284 | 396 | 313 | 312 |
| Extruder motor load Amps | 128 | 142 | 129 | 132 |
| Zone 1 Temperature, °C. | 37.8 | 37.8 | 37.8 | 37.8 |
| (°F.) (Set Point) | (100) | (100) | (100) | (100) |
| Zone 2 Temperature, °C. | 48.9 | 48.9 | 48.9 | 48.9 |
| (°F.) (Set Point) | (120) | (120) | (120) | (120) |
| Zone 3 Temperature, °C. | 65.6 | 65.6 | 65.6 | 65.6 |
| (°F.) (Set Point) | (150) | (150) | (150) | (150) |
| Zone 4 Temperature, °C. | 104.4 | 104.4 | 104.4 | 104.4 |
| (°F.) (Set Point) | (220) | (220) | (220) | (220) |
| Zone 5 Temperature, °C. | 132.2 | 132.2 | 132.2 | 132.2 |
| (°F.) (Set Point) | (270) | (270) | (270) | (270) |
| Zone 6 Temperature, °C. | 143.3 | 143.3 | 143.3 | 143.3 |
| (°F.) (Set Point) | (290) | (290) | (290) | (290) |
| Zone 7 Temperature, °C. | 154.4 | 154.4 | 154.4 | 154.4 |
| (°F.) (Set Point) | (310) | (310) | (310) | (310) |
| Zone 8 Temperature, °C. | 154.4 | 154.4 | 154.4 | 154.4 |
| (°F.) (Set Point) | (310) | (310) | (310) | (310) |

TABLE 9-continued

| | Run Number | | | |
|---|---|---|---|---|
| | 1 | 2 | 3 | 4 |
| Zone 9 (Adaptor) Temperature, °C. (° F.) (Set Point) | 176.7 (350) | 182.2 (360) | 182.2 (360) | 182.2 (360) |
| Die Plate Temperature, °C. (° F.) (Set Point) | 182.2 (360) | 182.2 (380) | 182.2 (380) | 182.2 (380) |
| Die Body Temperature, °C. (° F.) (Set Point) | 182.2 (360) | 187.8 (370) | 187.8 (370) | 187.8 (370) |
| Die Output Material Pressure, kscm (psi) | 93.6 (1331) | 86.1 (1225) | 84.9 (1208) | 84.6 (1203) |
| Cutter Speed % | 39 | 40.7 | 40.7 | 40.8 |

EXAMPLE 7

The twin-screw extruder used for Example 6 was employed to pelletize PARALOID® EXL-2691 MBS powder. There are 8 zone temperatures and a die plate temp differing from that in Example 3. The extruder included both atmospheric and vacuum vents. An underwater pelletizer was employed to pelletize the material exiting the die. The following Table 10 summarizes the process parameters and pellet data for five different flow rate settings (numbers 116–117 and 122–124 were chosen because the feeder throughput exceeded the set rate):

TABLE 10

| | Run Number | | | | |
|---|---|---|---|---|---|
| | 1 | 2 | 3 | 4 | 5 |
| Feed Rate, kg per hour (pounds per hour) | 416.5 (1115.91) | 420.0 (1125.33) | 451.4 (1209.37) | 452.8 (1213.13) | 464.8 (1245.41) |
| Extruder speed, RPM | 539.7 | 539.7 | 563.2 | 571.8 | 572.9 |
| Extruder motor load Amps | 242.67 | 237.26 | 258.92 | 272.61 | 273.59 |
| Zone 1, °C. (° F.) (Set point) | 39.4 (103) | 39.4 (103) | 39.4 (103) | 39.4 (103) | 39.4 (103) |
| Zone 2, °C. (° F.) (Set point) | 52.2 (126) | 52.2 (126) | 52.2 (126) | 52.2 (126) | 52.2 (126) |
| Zone 3, °C. (° F.) (Set point) | 81.1 (178) | 81.1 (178) | 81.1 (178) | 81.1 (178) | 81.1 (178) |
| Zone 4, °C. (° F.) (Set point) | 108.9 (228) | 108.9 (228) | 108.9 (228) | 108.9 (228) | 108.9 (228) |
| Zone 5, °C. (° F.) (Set point) | 135 (275) | 135 (275) | 135 (275) | 135 (275) | 135 (275) |
| Zone 6, °C. (° F.) (Set point) | 157.8 (316) | 157.8 (316) | 157.8 (316) | 157.8 (316) | 157.8 (316) |
| Zone 7, °C. (° F.) (Set point) | 166.7 (332) | 166.7 (332) | 166.7 (332) | 166.7 (332) | 166.7 (332) |
| Zone 8, °C. (° F.) (Set point) | 178.9 (354) | 178.9 (354) | 178.9 (354) | 178.9 (354) | 178.9 (354) |
| Die Plate, °C. (° F.) (Set point) | 169.4 (337) | 169.4 (337) | 169.4 (337) | 169.4 (337) | 169.4 (337) |

EXAMPLE 8

The twin-screw extruder used for Example 7 was employed to pelletize PARALOID® EXL-2691 MBS powder. The extruder included only atmospheric vents. An underwater pelletizer having was used to pelletize the material exiting the die. The following Table 11 summarizes the process parameters and pellet data for five different flow rate settings (numbers 19–20, 62–63 and 138 were selected).

TABLE 11

| | Run Number | | | | |
|---|---|---|---|---|---|
| | 1 | 2 | 3 | 4 | 5 |
| Feed Rate Actual, kg/hr (pounds per hour) | 335.6 (899.18) | 373.3 (1000.06) | 453.2 (1214.33) | 460.2 (1232.93) | 242.6 (650.10) |
| Extruder speed, RPM | 369.5 | 369.5 | 571.1 | 571.1 | 164.5 |
| Extruder motor load, Amps | 226.33 | 314.06 | 241.39 | 333.32 | 146.53 |
| Zone 1, °C. (° F.) (Set point) | 36.7 (98) | 36.7 (98) | 35.6 (96) | 35.6 (96) | 33.9 (93) |
| Zone 2, °C. (° F.) (Set point) | 46.7 (116) | 46.7 (116) | 42.8 (109) | 42.8 (109) | 38.3 (101) |
| Zone 3, °C. (° F.) (Set point) | 58.9 (138) | 58.9 (138) | 52.8 (127) | 52.8 (127) | 46.7 (116) |
| Zone 4, °C. (° F.) (Set point) | 88.9 (192) | 88.9 (192) | 82.8 (181) | 82.8 (181) | 69.4 (157) |
| Zone 5, °C. (° F.) (Set point) | 98.3 (209) | 98.3 (209) | 92.8 (199) | 92.8 (199) | 76.7 (170) |
| Zone 6, °C. (° F.) (Set point) | 131.7 (269) | 131.7 (269) | 126.1 (259) | 126.1 (259) | 112.2 (234) |
| Zone 7, °C. (° F.) (Set point) | 154.4 (310) | 154.4 (310) | 117.8 (244) | 117.8 (244) | 137.8 (280) |
| Zone 8, °C. (° F.) (Set point) | 168.9 (336) | 168.9 (336) | 167.8 (334) | 167.8 (334) | 134.4 (274) |
| Die Body, °C. (° F.) (Set point) | 160.6 (321) | 160.6 (321) | 146.7 (296) | 146.7 (296) | 135 (275) |
| Die Plate, °C. (° F.) (Set point) | 187.8 (370) | 187.8 (370) | 187.8 (394) | 187.8 (394) | 187.8 (363) |

The above methods produce pellets having a narrow distribution range. Table 12 below shows the size distribution of control pellets ("pellets A") and pellets produced in accordance with the present invention (Pellets B") as determined by a sieve shaker:

TABLE 12

| | Weight | | % Total | |
|---|---|---|---|---|
| Mesh | Pellets A | Pellets B | Pellets A | Pellets B |
| 4 | 0.74 | 0.12 | 0.313 | 0.039 |
| 5 | 28.41 | 308.04 | 12.02 | 99.166 |
| 6 | 75.93 | 2.47 | 32.14 | 0.795 |
| 8 | 118.30 | 0.00 | 50.085 | 0.000 |
| 30 | 12.82 | 0.00 | 5.428 | 0.000 |
| 45 | 0.00 | 0.00 | 0.000 | 0.000 |
| Total | 236.20 | 310.63 | 100.00 | 100.00 |

Further, the above methods produce pellets having increased bulk densities as compared to controls.

While the invention has been described with reference to one or more preferred embodiments, it will be understood by those skilled in the art that various changes may be made and equivalence may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for processing an impact modifier material having a core and shell molecular structure, the method comprising working the impact modifier material in a mild extruder to a state such that at least a portion of the shells of the impact modifier material fuse together to form an impact modifier material output; and pelletizing the impact modifier output, said impact modifier material comprises methacrylate butadiene styrene, acrylonitrile butadiene styrene, acrylonitrile styrene acrylic, or any combination comprising at least one of the foregoing impact modifier materials, said method further comprising maintaining a processing temperature at a softening temperature, wherein the shells of the core and shell structures fuse and the core of the core and shell structures are minimally disrupted when worked by the mild extruder at the softening temperature.

2. The method as in claim 1, wherein the processing temperature is maintained by friction imparted to the impact modifier material, heat applied internally or externally to the extruder, heat removed internally or externally to the extruder, or any combination comprising one of the foregoing ways to maintain the processing temperature.

3. The method as in claim 1, wherein the mild extruder comprises a first portion configured and dimensioned for solid conveyance of the material and a second portion configured and dimensioned for plasticating the material.

4. The method as in claim 1, wherein the working is by a single screw extruder.

5. The method as in claim 4, wherein in the single screw extruder comprises a first portion configured and dimensioned for consolidating the material and a second portion configured and dimensioned for plasticizing of the material.

6. The method as in claim 5, wherein said single screw extruder comprises a flight that traverses said first portion and said second portion, said flight being configured and dimensioned for the respective first and second portions.

7. The method as in claim 6, wherein said single screw extruder further comprises a third portion configured and dimensioned for transporting the material.

8. The method as in claim 5, wherein said single screw extruder comprises:
a barrel portion having a feed opening and an output opening;
a screw positioned within said barrel portion, said screw comprising a longitudinal body and at least one flight helically traversing at least a portion of said screw, said flight characterized by a depth being the radial distance between said body and an outermost flight portion, wherein said depth is configured and dimensioned for transporting and extruding the material in a transport direction from said feed opening to said output opening.

9. The method as in claim 1, wherein the working is by a twin screw extruder.

10. The method as in claim 9, wherein said twin screw extruder comprises a first portion configured and dimensioned for consolidating the material and a second portion configured and dimensioned for plasticizing of the material.

11. The method as in claim 10, wherein said twin screw extruder comprises a flight that traverses said first portion and said second portion, said flight being configured and dimensioned for the respective first and second portions.

12. The method as in claim 10, wherein said twin screw extruder further comprises a third portion configured and dimensioned for transporting the material.

13. The method as in claim 10, wherein said twin screw extruder comprises a pair of screws, each screw comprising a flight that traverses the first portion, the second portion, and the third portion, said flight configured and dimensioned for the respective first, second, and third portion.

14. The method as in claim 1, wherein the impact modifier material is pelletized with an underwater pelletizer or a hot die face pellet mill.

* * * * *